J. W. MURPHY.
CONDENSATION PREVENTING DEVICE.
APPLICATION FILED JUNE 17, 1920.
1,378,604.
Patented May 17, 1921.
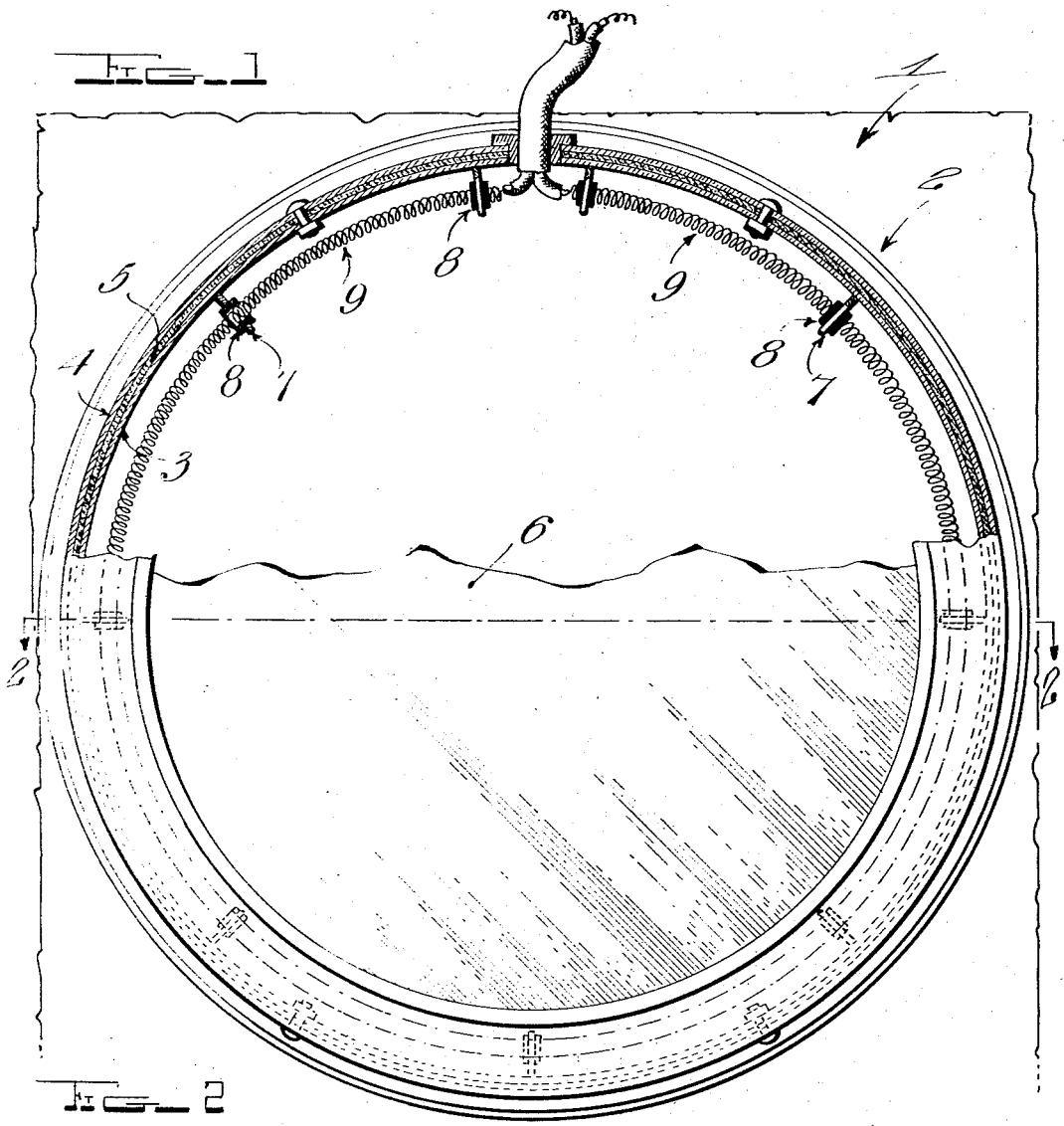
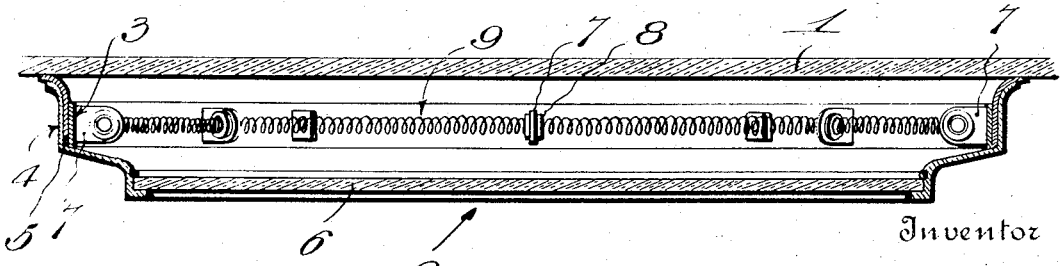
Witness
Inventor
John W. Murphy
By
Attorneys

UNITED STATES PATENT OFFICE.

JOHN W. MURPHY, OF CAMBRIDGE, MASSACHUSETTS.

CONDENSATION-PREVENTING DEVICE.

1,378,604.  Specification of Letters Patent.  Patented May 17, 1921.

Application filed June 17, 1920. Serial No. 389,718.

*To all whom it may concern:*

Be it known that I, JOHN W. MURPHY, a citizen of the United States, residing at Cambridge, in the county of Middlesex and State of Massachusetts, have invented certain new and useful Improvements in Condensation-Preventing Devices; and I do declare the following to be a full, clear, and exact description of the invention, such as will enable others skilled in the art to which it appertains to make and use the same.

This invention relates to improvements in condensation preventing devices for application on windows, vehicle windshields, and the like.

An object of the invention is to provide a novel device of this class in the form of an electrically heated box to be attached to the inner side of a vehicle windshield, window pane or the like by means of suitable clamps, the heating coil of the device obtaining its power from the car battery or other suitable source of electricity, thus heating the member upon which it is attached to such an extent as to prevent rain and snow from depositing on the outer surface of the glass, or frost forming on the inner surface of the glass.

Another object of the invention is to provide a device of the above mentioned class which is provided with packing which serves to form a tight joint between the device and the plate of glass on which it is placed, novel means being employed for retaining the packing in position, and this means including other means for supporting and retaining a heating coil in position.

Other objects and advantages of the invention will be apparent during the course of the following description.

In the accompanying drawings forming a part of this specification and in which like numerals are employed to designate like parts throughout the same:

Figure 1 is a front elevational view, with parts in section, of a device construction in accordance with my invention, the same being shown and applied upon a plate of glass.

Fig. 2 is a transverse section taken on the line 2—2 of Fig. 1.

In carrying out my invention I employ a frame for attachment to a plate of glass, a pane of glass being carried by the frame, and a strip of packing material being associated with the frame and being adapted to bear against the windshield or other like member upon which the device is installed. Means for clamping the packing in position in the frame is employed, and this means carries other means for supporting and retaining a heating coil in position.

In the drawings, wherein for the purpose of illustration is shown a preferred embodiment of my invention, the numeral 1 designates a window pane or automobile windshield glass, upon which my device, designated as a whole by the numeral 2, is placed. In applying the device I, of course, place it upon the inner side of the glass so as to prevent formation of frost, which as is well known only forms on the inner side of a window-pane.

Referring to the drawings it will be seen that the device comprises inner and outer rim members 3 and 4, the last named of which is of a size to extend beyond the opposite edges of the member 3. Disposed between the members 3 and 4 and extending beyond one edge of the member 3 is a strip of packing material 5, the extending portion of which is intended to bear against the glass 1 and form a tight joint between the latter and the device. Carried by the member 4 at its opposite edge, is a pane of glass 6 which converts the device into a chamber, that is, a chamber is formed between the glass 1 and itself. The rim 3 serves to clamp the packing material 5 against the rim 4, and thus retains the packing material in proper position. With this construction it will be seen that the packing material may be removed and replaced whenever necessary. Carried by the member 3 and extending laterally inward therefrom, are a plurality of apertured ears 7, in the apertures of which are fitted insulating sleeves or bushings 8 through which the heating coil 9 is passed. It is obvious that this construction forms a novel way of supporting and retaining the heating coil in position. Current is supplied to the coil 9 from any suitable source, such as for instance the battery of an automobile when the device is attached to an automobile windshield.

With a device constructed in accordance with the foregoing description, it will be seen that when current is supplied to the heating coil 9, the space between the panes of glasses 1 and 6 will be heated and the glass 1 will in turn become heated to such a degree that snow and rain accumulating on the weather side of the glass 1 will be immediately dislodged, vaporated, or melted. When the device is placed upon the inside of the window pane, frost will be prevented from forming on the window pane, as it ordinarily does in cold weather.

While I have shown an electric coil as the heating element, I do not desire to limit myself to this particular type of heating element, because steam or hot air may equally well serve the purpose, and as I employ novel means for supporting the heating coil, this same means will equally well serve to support a pipe through which steam or hot air may be passed. I do not desire to be limited to any particular type of clamps for retaining the device in position, because the structure of the clamps will vary according to the type of glass upon which my device will be installed.

Furthermore, I desire it to be understood that the form of my invention herein shown and described is to be taken as a preferred form of the same, and that various minor changes in the shape, size, and arrangement of parts may be resorted to without departing from the spirit of the invention or the scope of the subjoined claims.

I claim:

1. A device of the class described comprising a frame for disposition against a plate of glass, a strip of packing material carried by the frame and extending therefrom, being adapted to fit against the plate of glass, a pane of glass also carried by said frame, a heating coil, and a clamping member for retaining the packing material in position and for supporting said coil and retaining the latter in position.

2. A device of the class described comprising a frame including a rim, a piece of glass carried by said frame, a strip of packing material fitted against said rim and extending beyond the edge of the same, being designed to bear against a plate of glass, a clamping member associated with the frame and retaining the packing against said rim, said member being provided with inwardly extending ears which serve to support and retain a heating coil in place.

3. A device of the class described comprising inner and outer rim members, the latter being of a greater width than the former and extending beyond the opposite edges of the same, a strip of packing material disposed between the rims and extending beyond one edge of the outer rim, being intended to bear against a piece of glass, a pane of glass secured to and carried by the opposite edge of the outer rim, a plurality of inwardly extending apertured lugs carried by said inner rim, insulating sleeves fitted in the apertures of said ears, and a heating coil extending through and supported by said sleeves.

In testimony whereof I have hereunto set my hand.

JOHN W. MURPHY.